(12) United States Patent
Care et al.

(10) Patent No.: US 6,800,334 B2
(45) Date of Patent: Oct. 5, 2004

(54) POWDER COATING COMPOSITION INCORPORATING A WAX IN POST-BLENDED FORM

(75) Inventors: Martyn P. Care, Tynemouth (GB);
Paul J. Tinmouth, South Shields (GB);
Jae-Kyn Park, Seoul (KR)

(73) Assignee: International Coatings Limited, London (GB)

( * ) Notice: Subject to any disclaimer, the term of this patent is extended or adjusted under 35 U.S.C. 154(b) by 0 days.

(21) Appl. No.: 10/182,897

(22) PCT Filed: Feb. 8, 2001

(86) PCT No.: PCT/GB01/00502
§ 371 (c)(1),
(2), (4) Date: Dec. 12, 2002

(87) PCT Pub. No.: WO01/59017
PCT Pub. Date: Aug. 16, 2001

(65) Prior Publication Data
US 2003/0176558 A1 Sep. 18, 2003

(30) Foreign Application Priority Data
Feb. 8, 2000 (GB) ............................................. 0002844

(51) Int. Cl.[7] ............................. B05D 1/04; C08L 91/06
(52) U.S. Cl. ....................... 427/475; 427/485; 106/272; 428/484
(58) Field of Search ................................. 427/485, 470, 427/475, 486, 202, 203, 409, 410, 412.1, 508, 521, 378, 379, 386, 388.4, 476, 181, 195; 106/272, 10, 502; 428/484

(56) References Cited
U.S. PATENT DOCUMENTS 3,770,482 A * 11/1973 Millar et al.
4,678,284 A    7/1987 Tashiro
5,356,971 A   10/1994 Sagawa et al.
5,395,687 A    3/1995 Totsuka et al.
5,633,108 A    5/1997 Christy et al.
5,735,944 A *  4/1998 Haubennestel et al.
5,856,378 A    1/1999 Ring et al.

FOREIGN PATENT DOCUMENTS

| DE | 36 00 395 A1 | 8/1987 |
| EP | 0 397 923 A2 | 5/1989 |
| EP | 0 697 277 A2 | 2/1996 |
| EP | 0 786 503 A2 | 7/1997 |
| EP | 0 967 255 A1 | 12/1999 |
| GB | 2 119 390 A | 11/1983 |
| WO | WO 00/01775 | 1/2000 |
| WO | 00/01775 * | 1/2000 |

* cited by examiner

Primary Examiner—Fred J. Parker
(74) Attorney, Agent, or Firm—Nixon & Vanderhye

(57) ABSTRACT

A powder coating composition incorporating a wax in post-blended form, the composition incorporating the wax and the same composition without the wax being separated, preferably widely separated, in a triboelectric reference series indicative of the extent to which powder coating compositions may be distinguishable from one another when electrically charged. The powder coating composition incorporating a wax in post-blended form is especially suitable for coating articles having recessed portions. A quantitative basis is given for determining separation in the triboelectric reference series, and preferred minimum separation criteria are given. The effects obtainable using post-blended wax may be enhanced by the use, as further post-blended additives, of a combination of aluminium oxide and aluminium hydroxide.

23 Claims, 3 Drawing Sheets

Difference in Tribo Charging Between Two Coloured Samples

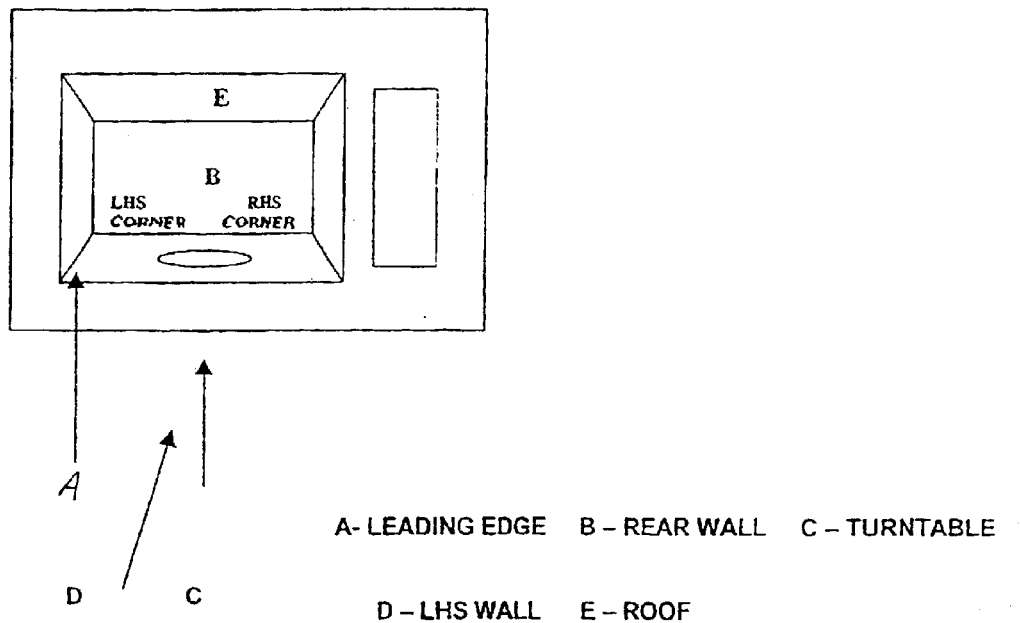
Figure 1. Measurement Positions on Microwave Cavity.
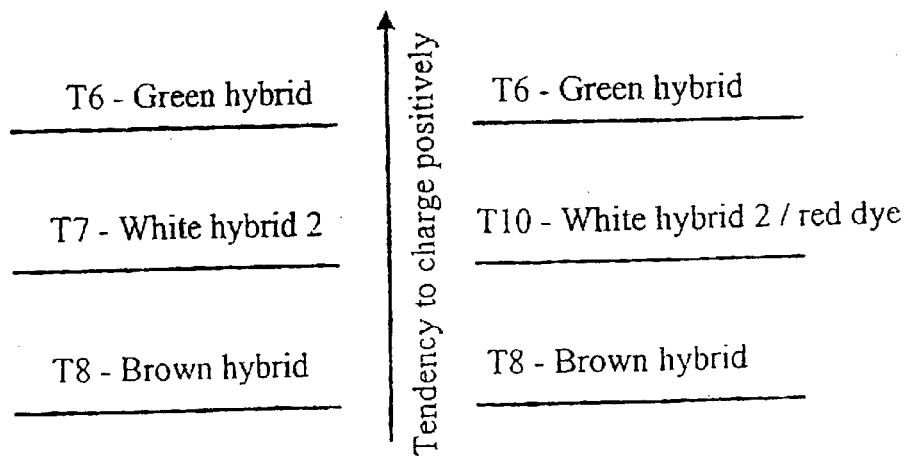
Figure 2 : Effect of Dyestuff on the Triboelectric Position of a White Hybrid

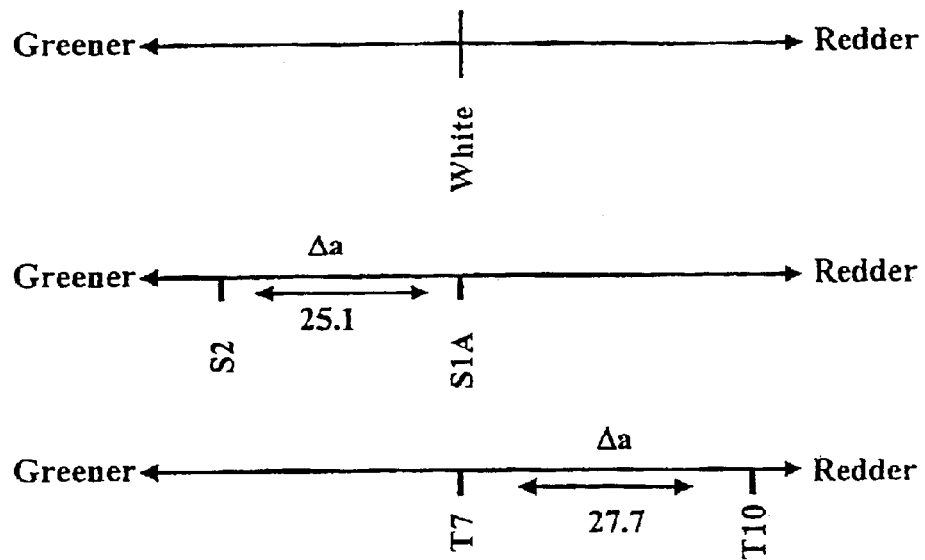
Figure 3 : Difference in Tribo Charging Between Two Coloured Samples
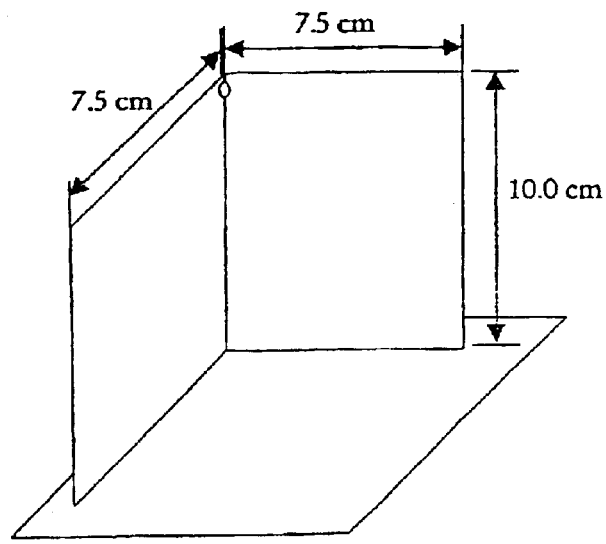
Figure 4:

POWDER COATING COMPOSITION INCORPORATING A WAX IN POST-BLENDED FORM

This invention relates to powder coating compositions and to their use in coating substrates, especially substrates of complicated shape, with particular reference to articles having recessed portions.

BACKGROUND OF THE INVENTION

Powder coating compositions generally comprise a solid film-forming resin binder, usually with one or more colouring agents such as pigments, and optionally also contain one or more performance additives. They are usually thermosetting, incorporating, for example, a film-forming polymer and a corresponding curing agent (which may itself be another film-forming polymer), but thermoplastic systems (based, for example, on polyamides) can in principle be used instead. Powder coating compositions are generally prepared by intimately mixing the ingredients (including colouring agents and performance additives) for example in an extruder, at a temperature above the softening point of the film-forming polymer(s) but below a temperature at which significant pre-reaction would occur. The extrudate is usually rolled into a flat sheet and comminuted, for example by grinding, to the desired particle size. Other homogenisation processes also come into consideration, including non-extruder-based processes such as, for example, processes involving mixing using supercritical fluids, especially carbon dioxide.

Powder coating compositions are generally applied by an electrostatic spray process in which the powder coating particles are electrostatically charged by the spray gun and the substrate (normally metallic) is earthed. The charge on the powder coating particles is normally applied by interaction of the particles with ionised air (corona charging) or by friction (tribostatic or "tribo" charging). The charged particles are transported in air towards the substrate and their final deposition is influenced inter alia by the electric field lines that are generated between the spray gun and the workpiece. A disadvantage of this process is that there are difficulties in coating articles having complicated shapes, and especially articles having recessed portions, as a result of restricted access of the electric field lines into recessed locations (the Faraday cage effect), especially in the case of the relatively strong electric fields generated in the corona-charging process. The Faraday cage effect is much less evident in the case of tribostatic charging processes, but those processes have other drawbacks.

As an alternative to electrostatic spray processes, powder coating compositions may be applied by fluidised-bed processes, in which the substrate workpiece is preheated (typically to 200° C.–400° C.) and dipped into a fluidised bed of the powder coating composition. The powder particles that come into contact with the preheated surface melt and adhere to the workpiece. In the case of thermosetting powder coating compositions, the initially-coated workpiece may be subjected to further heating to complete the curing of the applied coating. Such post-heating may not be necessary in the case of thermoplastic powder coating compositions.

Fluidised-bed processes eliminate the Faraday cage effect, thereby enabling recessed portions in the substrate workpiece to be coated, and are attractive in other respects, but have the well-known disadvantage that the applied coatings are substantially thicker than those obtainable by electrostatic coating processes.

Another alternative application technique for powder coating compositions is the so-called electrostatic fluidised-bed process, in which the fluidising air is ionised by means of charging electrodes arranged in the fluidising chamber or, more usually, in the plenum chamber below the porous air-distribution membrane. The ionised air charges the powder particles, which acquire an overall upwards motion as a result of electrostatic repulsion of identically charged particles. The effect is that a cloud of charged powder particles is formed above the surface of the fluidised bed. The substrate workpiece (earthed) is introduced into the cloud and powder particles are deposited on the substrate surface by electrostatic attraction. No preheating of the substrate workpiece is required.

The electrostatic fluidised-bed process is especially suitable for coating small articles, because the rate of deposition of the powder particles becomes less as the article is moved away from the surface of the charged bed. Also, as in the case of the traditional fluidised-bed process, the powder is confined to an enclosure and there is no need to provide equipment for recycling and reblending the overspray that is not deposited on the substrate. As in the case of the corona-charging electrostatic process, however, there is a strong electric field between the charging electrodes and the substrate workpiece and, as a result, the Faraday cage effect operates to a certain extent and leads to poor deposition of powder particles into recessed locations on the substrate.

WO 99/30838 proposes a process which comprises the steps of establishing a fluidised bed of a powder coating composition, immersing the substrate wholly or partially within the said fluidised bed, applying a voltage to the substrate for at least part of the period of immersion, whereby particles of the powder coating composition are charged substantially by friction alone and adhere to the substrate, withdrawing the substrate from the fluidised bed and forming the adherent particles into a continuous coating over at least part of the substrate.

As compared with processes in which a substantial electric field is generated between charging electrodes and the substrate workpiece, the process of WO 99/30838, which is conducted without ionisation or corona effects in the fluidised bed, offers the possibility of achieving good coating of substrate areas which are rendered inaccessible by the Faraday cage effect.

SUMMARY OF THE INVENTION

The present invention provides a powder coating composition which incorporates a wax in a post-blended form.

The term "post-blended" means that the wax material has been incorporated after the extrusion or other homogenisation process (for convenience referred to hereinafter simply as "extrusion").

The use of post-blended wax in accordance with the invention offers the possibility of achieving improved Faraday cage penetration in the coating of substrates and, as a result, more uniform coating of substrates having recessed areas or other locations rendered difficultly accessible by the Faraday cage effect, for example, the internal corner regions of microwave ovens. In particular, the invention enables the desired minimum coating thickness to be achieved on such regions without having to apply excess material to other more easily accessible areas of the substrate. Substantial savings of powder coating material are possible.

It will be understood that the use of post-blended wax in accordance with the invention is clearly distinct from prior proposals to incorporate wax for different purposes before or during extrusion. Such proposals can, however, be combined with the practice of the present invention.

The advantages of the invention are best seen in corona application processes, but other application processes may in principle be used instead, although the effect of the invention will generally then be less pronounced.

The invention further provides a process for forming a coating on a substrate, in which a composition according to the invention is applied to the substrate by a powder coating process, preferably a corona application process, resulting in particles of the composition adhering to the substrate, and forming the particles into a continuous coating.

The substrate is advantageously an article having recessed portions subject to the Faraday cage effect, and for an article having multiple faces the ratio of the minimum to maximum coating thickness is advantageously at least 40%, preferably at least 50%.

The invention also provides the use of a powder coating composition of the invention in coating an article having recessed portions which may be, for example, the interior of a refrigerator or microwave oven, an alloy wheel, an architectural extrusion or a radiator fin.

The wax in a powder coating composition of the invention is advantageously a synthetic wax, preferably a polyethylene (PE) or polytetrafluoroethylene (PTFE) wax, a PE wax modified with PTFE or polyamide, or a polyamide wax. In principle, however, other wax materials may be used instead, for example:

i) Natural animal waxes (for example, beeswax, lanolin);

ii) Natural vegetable waxes (for example, carnauba wax); or iii) Natural petroleum or other mineral waxes (for example, paraffin wax, microcrystalline wax); or iv) any of classes i)-iii) modified by PTFE or polyamide.

An important group of waxes for use in accordance with the invention comprises esters of long-chain aliphatic alcohols (typically $C_{16}$ and above) with long-chain fatty acids (typically $C_{16}$ and above). Such esters and acids are preferably straight-chain compounds, and may be saturated or unsaturated. Examples of acids which may be used include stearic acid, palmitic acid and oleic acid and mixtures of two or more thereof.

Waxes derived from long-chain aliphatic compounds as described above may include hydrocarbons.

In addition to esters of the long-chain acids as described above there may be mentioned salts such as, for example, aluminium stearate.

Preferred wax materials for use in accordance with the invention are materials which have good compatibility with the polymer component(s) of the powder coating composition, that is to say, materials which can be mixed homogeneously with the polymers without significant phase separation. It will be found that some wax materials (for example, halogenated waxes) are in general not compatible in this sense with the powder coating polymer(s). The use of such materials would be expected to give rise to defects in the surface appearance of the finished applied coating, and is accordingly not recommended.

Particular examples of suitable waxes include the following manufactured by Lubrizol: LANCO WAX A. 1601 (a fatty acid amide wax), LANCO WAX HM. 1666 (an amide wax) and LANCO WAX TF 1725 (a PTFE-modified polyethylene wax).

The amount of wax may be in the range 0.03–2%, but mention may be made of amounts in the range of from 0.03 to 0.8% by weight and 0.03 to 0.5% by weight. In addition, care is necessary to ensure that the powder coating composition does not become too sticky, and it may also be found that the penetration-enhancing effect of post-blended wax will diminish, with increasing wax addition, after a maximum value has been reached. The preferred maximum wax content will in general be 0.3 or 0.2%, more especially not exceeding 0.1%, all percentages being by weight and being based on the weight of the composition without the wax. Particular mention may be made of amounts in the range of from 0.05 to 0.1% by weight, especially 0.07 to 0.1%.

In general, the $T_g$ of the wax should be above that of the remainder of the powder coating composition. This serves to reduce the tendency of the composition to become sticky as a result of incorporation of the wax. Preferably, the $T_g$ of the wax is in the range of from 100° to 140° C.

In principle, more than one wax may be used as post-blended additive in accordance with the invention. In general, however, the use of a plurality of waxes will militate against the achievement of optimum results. If more than one wax is to be used, it is considered preferable to divide the base composition into a corresponding number of portions, post-blend a different wax with each portion and then mix the resulting powders together. Incorporation of two or more waxes in the same post-blending operation is not recommended.

Post-blending of the wax may be achieved, for example, by any of the following dry-blending methods:

a) tumbling the wax into the chip before milling;

b) injection at the mill, with the chip and wax fed into the mill simultaneously;

c) introduction at the stage of sieving after milling;

d) post-production blending in a "tumbler" or other suitable mixing device; or e) introduction into a fluidised-bed powder reservoir supplying an electrostatic powder application gun.

In the case of method a) or b), the particle size of the wax is preferably less than that of the chip, and advantageously <50 microns. In the case of method c), d) or e), the particle size of the wax is preferably less than that of the powder coating composition, preferably <30 microns, more especially <15 microns, for example <10 microns.

The effects obtainable by the use of post-blended wax in accordance with the invention may be enhanced by the use, as further post-blended additives, of a combination of aluminium oxide and aluminium hydroxide, typically in proportions in the range of from 1:99 to 99:1 by weight, advantageously from 10:90 to 90:10, preferably from 30:70 to 70:30, for example, from 45:55 to 55:45. The combination of aluminium oxide and aluminium hydroxide is disclosed in WO 94/11446 as a fluidity-assisting post-blended additive. Other combinations of the inorganic materials disclosed in WO 94/11446 may in principle also be used in the practice of the present invention.

Such further post-blended additives may be incorporated with the composition simultaneously with the wax or separately from it, and may be incorporated by any of the post-blending techniques described in relation to the wax. Although any such additive or mixed sub-combination of additives may in principle be incorporated separately in the powder coating composition, pre-mixing of additives (other than the wax) is generally preferred.

Combinations of aluminium oxide and aluminium hydroxide (and similar additives) are advantageously used in amounts in the range of from 0.25 to 0.75% by weight, preferably 0.45 to 0.55%, based on the weight of the composition without the additives. Amounts up to 1% or 2% by weight may be used, but problems can arise if too much is used, for example, bit formation and decreased transfer efficiency.

Whilst the post-blended wax may in principle be in the form of wax deposited on a carrier material (such as, for example, silica), the use of such inhomogeneous materials is in general not recommended in the practice of the present invention.

The particle size distribution of the powder coating composition may be in the range of from 0 to 150 microns, generally up to 120 microns, with a mean particle size in the range of from 15 to 75 microns, preferably at least 20 or 25 microns, advantageously not exceeding 50 microns, more especially 20 to 45 microns. Although the invention can in principle offer advantages over the whole range of particle size distributions, it has been found that the benefits in terms of Faraday cage penetration tend to be less pronounced in relatively fine particle size distributions.

A powder coating composition according to the invention may contain a single film-forming powder component comprising one or more film-forming resins or may comprise a mixture of two or more such components.

The film-forming resin (polymer) acts as a binder, having the capability of wetting pigments and providing cohesive strength between pigment particles and of wetting or binding to the substrate, and melts and flows in the curing/stoving process after application to the substrate to form a homogeneous film.

The or each powder coating component of a composition of the invention will in general be a thermosetting system, although thermoplastic systems (based, for example, on polyamides) can in principle be used instead.

When a thermosetting resin is used, the solid polymeric binder system generally includes a solid curing agent for the thermosetting resin; alternatively two co-reactive film-forming thermosetting resins may be used.

The film-forming polymer used in the manufacture of the or each component of a thermosetting powder coating composition according to the invention may be one or more selected from carboxy-functional polyester resins, hydroxy-functional polyester resins, epoxy resins, and functional acrylic resins.

A powder coating component of the composition can, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10–100, a number average molecular weight Mn of 1,500 to 10,000 and a glass transition temperature Tg of from 30° C. to 85° C., preferably at least 40° C. The poly-epoxide can, for example, be a low molecular weight epoxy compound such as triglycidyl isocyanurate (TGIC), a compound such as diglycidyl terephthalate condensed glycidyl ether of bisphenol A or a light-stable epoxy resin. Such a carboxy-functional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehye resin, or a glycol ural formaldehye resin, for example the material "Powderlink 1174" supplied by the Cyanamid Company, or hexahydroxymethyl melamine. A blocked isocyanate curing agent for a hydroxy-functional polyester may, for example, be internally blocked, such as the uretdione type, or may be of the caprolactam-blocked type, for example isophorone diisocyanate.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin can be used with an appropriate curing agent.

Mixtures of film-forming polymers can be used, for example a carboxy-functional polyester can be used with a carboxy-functional acrylic resin and a curing agent such as a bis(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy- or hydroxy-functional). Such resin combinations may be selected so as to be co-curing, for example a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isopherone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

A powder coating composition for use according to the invention may be free from added colouring agents, but usually contains one or more such agents (pigments or dyes). Examples of pigments which can be used are inorganic pigments such as titanium dioxide, red and yellow iron oxides, chrome pigments and carbon black and organic pigments such as, for example, phthalocyanine, azo, anthraquinone, thioindigo, isodibenzanthrone, triphendioxane and quinacridone pigments, vat dye pigments and lakes of acid, basic and mordant dyestuffs. Dyes can be used instead of or as well as pigments.

The composition of the invention may also include one or more extenders or fillers, which may be used inter alia to assist opacity, whilst minimising costs, or more generally as a diluent.

The following ranges should be mentioned for the total pigment/filler/extender content of a powder coating compo sition according to the invention (disregarding post-blend additives):

0% to 55% by weight,
0% to 50% by weight,
10% to 50% by weight,
0% to 45% by weight, and
25% to 45% by weight Of the total pigment/filler/extender content, the pigment content will generally be ≦40% by weight of the total composition (disregarding post-blend additives) but proportions up to 45% or even 50% by weight may also be used. Usually a pigment content of 25–35% is used, although in the case of dark colours opacity can be obtained with <10% by weight of pigment.

The composition of the invention may also include one or more performance additives, for example, a flow-promoting agent, a plasticiser, a stabiliser against UV degradation, or an anti-gassing agent, such as benzoin, or two or more such additives may be used. The following ranges should be mentioned for the total performance additive content of a powder coating composition according to the invention (disregarding post-blend additives):

0% to 5% by weight,
0% to 3% by weight, and
1% to 2% by weight.

In general, colouring agents, fillers/extenders and performance additives as described above will not be incorporated by post-blending, but will be incorporated before and/or during the extrusion or other homogenisation process.

After application of the powder coating composition to a substrate, conversion of the resulting adherent particles into a continuous coating (including, where appropriate, curing of the applied composition) may be effected by heat treatment and/or by radiant energy, notably infra-red, ultra-violet or electron beam radiation.

The powder is usually cured on the substrate by the application of heat (the process of stoving); the powder particles melt and flow and a film is formed. The curing times and temperatures are interdependent in accordance with the composition formulation that is used, and the following typical ranges may be mentioned:

| Temperature/° C. | Time |
| --- | --- |
| 280 to 100* | 10 s to 40 min |
| 250 to 150 | 15 s to 30 min |
| 220 to 160 | 5 min to 20 min |

*Temperatures down to 90° C. may be used for some resins, especially certain epoxy resins.

The invention is applicable over a wide range of applied film thicknesses, typically from thin films of, for example, 30 microns or less up to films of 50, 100, 150 or 200 microns. A typical minimum film thickness is 5 microns.

As a generality, for any given powder coating composition, the extent of advantage gained by the use of post-blended wax in accordance with the invention is dependent on the nature of the wax used. More specifically, it has been found in accordance with the invention that the results in terms of Faraday cage penetration can be enhanced by selecting the wax taking into consideration a measure of the tendency of the base composition to become positively or negatively charged in a tribocharging environment.

In one approach, mixtures consisting of one part which is a basic powder coating composition and another part which is the basic powder coating composition treated with a wax are charged tribostatically and the basic part is found to become charged predominantly in one sense while the wax-treated part is found to become charged predominantly in the opposite sense, permitting the separation of the mixture into the basic part and the wax-treated part by directing it at two oppositely charged plates. It is found that some mixtures of basic-part and wax-treated-part powder coating compositions separate to a greater extent than do others when directed at oppositely charged plates.

The fact that the basic-part and the wax-treated part of a powder coating composition are found to become oppositely charged provides a basis for establishing a triboelectric series of the powder coating compositions including basic powder coating compositions with and without wax treatment. The basic powder coating compositions themselves are known to be separable when mixed with one another and charged tribostatically, one basic powder coating composition acquiring a positive charge while the other acquires a negative charge, as shown by a tendency to separate onto two oppositely charged plates. In the resulting triboelectric series, the relative positions of the basic and wax-treated powder coating compositions are such that each powder coating composition takes on a negative charge in a charged mixture with the powder coating composition positioned immediately above it and a positive charge in a charged mixture with the powder coating composition positioned immediately below it.

The fact that some charged mixtures separate to a greater extent than do others leads to the expectation that basic and wax-treated powder coating compositions occupying widely separated positions in the triboelectric series separate from each other to a greater extent than do basic and wax-treated powder coating compositions that occupy adjacent positions in the triboelectric series.

A procedure for establishing a triboelectric series for the purposes of the present invention may include the following steps:

(i) selecting a plurality of powder coating compositions for inclusion in the triboelectric series, (ii) selecting a first two of the powder coating compositions, (iii) mixing the two selected powder coating compositions in substantially equal amounts, (iv) causing tribostatic charging of the mixture of powder coating compositions by tribostatic interaction to establish equilibrium tribostatically charged conditions, (v) directing the tribostatically charged mixture at two electrically charged plates of opposite polarities relative to each other, (vi) identifying which of the two powders adheres to the electrically positive plate, (vii) so allocating positions to the two powder coating compositions in the triboelectric series that the the powder coating composition which adheres to the positive plate occupies a position immediately below the position of the powder coating composition which adheres to the negative plate, (viii) repeating the steps (ii) to (vii) until all of the powder coating compositions have been tested in pairs and allocated positions in the triboelectric series.

The steps (iv) and (v) above may be combined by ejecting the mixed powder coating compositions from a powder application gun supplied from a fluidised-bed hopper.

In a procedure which maintains the separation of the steps (iv) and (v) above, the step (iv) comprises placing two powders in a glass jar, shaking the glass jar for a set period, for example, about two minutes then allowing a 30 second relaxation time.

In a preferred procedure again maintaining the separation of the steps (iv) and (v) above, the step (iv) comprises fluidising the mixture and allowing it to develop its equilibrium natural tribostatic charge.

When the above procedure is performed on a plurality of coloured basic powder coating compositions visual identification of the basic powder coating compositions is permitted. Black powder coating compositions and white powder coating compositions may, of course, be included.

An adequate number of basic powder coating compositions for establishing a triboelectric series is seven and more than seven provides a more comprehensive triboelectric series. A minimum number of basic powder coating compositions for the triboelectric series is of the order of five. Specific materials may be included in the series in order to indicate reference positions although such materials are not necessarily included in powder coating compositions. Suitable reference materials are PTFE (polytetrafluoroethylene) occupying the lowest possible position and polyamide occupying the highest possible position in the triboelectric series.

The triboelectric series should include at least one pair of basic powder coating compositions which, when subjected to the above mixing, charging and separation procedure, separate between the charged plates to the extent that substantially all of one basic powder adheres to the positive plate and substantially all of the other basic powder adheres to the negative plate. Two such basic powder coating compositions fully satisfy the requirement for powder coating compositions that are well-separated in terms of triboelectric performance. Analogously, the triboelectric series will include basic powder coating compositions which, when subjected to the above mixing, charging and separation procedure, separate little or not at all between the charged plates. Two powder coating compositions that make up mixtures which separate little or not at all fail to meet the requirement for powder coating compositions that are well-separated in terms of triboelectric performance.

Where two differently coloured powder coating compositions are subjected to the above mixing, charging and separation procedure and the two powder coating compositions fully satisfy the requirement for powder coating compositions that are well-separated in terms of triboelectric performance, the result is that the colour of the powder coating composition adhering to the positive plate is substantially the same colour as one powder coating composition, the colour of the powder coating composition adhering to the negative plate being substantially the same as the colour of the other powder coating composition. It follows that a subjective quantitative assessment of the triboelectric performance of two differently coloured powders is possible by visual inspection of the colours of the powder coating compositions on the positive and negative plates relative to the respective colours of the powder coating compositions before they are mixed.

An objective quantitative assessment of of the triboelectric performance of two differently coloured powders is made with the assistance of a close tolerance reference colour spectrophotometer capable of operating in accordance with the CIE $L^*a^*b^*_{1976}$ system for assessing differences between colour samples. CIE is an abbreviation of Commission International d'Eclairage.

A suitable spectrophotometer is a Spectraflash SF600 PLUS CT manufactured by Datacolor International.

The CIE $L^*a^*b^*_{1976}$ system is a standard for defining colours in terms of a three-dimensional coordinate system and, for rectangular coordinates, $a^*$ is the x-coordinate variable, $b^*$ is the y-coordinate variable and $L^*$ is the z-coordinate variable. The range of $L^*$ is 0 to 100 and the ranges of $a^*$ and $b^*$ are both −100 to 100.

The following reference coordinates are included in the CIE $L^*a^*b^*_{1976}$ system:

Green: $a^*=-100$, $b^*=0$, $L^*=50$
Red: $a^*=100$, $b^*=0$, $L^*=50$
Blue: $a^*=0$, $b^*=-100$, $L^*=50$
Yellow: $a^*=0$, $b^*=100$, $L^*=50$
White: $a^*=0$, $b^*=0$, $L^*=100$
Black: $a^*=0$, $b^*=0$, $L^*=0$ The colour spectrophotometer operating in accordance with the CIE $L^*a^*b^*_{1976}$ system is capable of expressing the separation between two colour pigments as $\Delta E$, where $\Delta E^2 = \Delta L^{*2} + \Delta a^{*2} + \Delta b^{*2}$ where $\Delta L^*$, $\Delta a^*$ and $\Delta b^*$ are measured in the z, x and y directions, respectively. The magnitude of $\Delta E$ is $(\Delta L^{*2} + \Delta a^{*2} + \Delta b^{*2})^{1/2}$.

Elementary electrostatics permits the separation of oppositely charged particles by directing them towards oppositely charged plates. The negative particles are collected on the positive plate, and vice versa. Provided that there is some discernible difference between the two types of particle then the procedure permits the quantification of the degree of separation between two species in the mixture, by the use of differently coloured particles.

Established procedures for describing the charging behaviour of powder coatings use bulk measurements, which are relatively crude in assessing the charge characteristics of powders. By way of example, consider the following two cases:

| Case A | Case B |
|---|---|
| 2 particles of charge +3 | 2 particles of charge +8 |
| 2 particles of charge −2 | 2 particles of charge −7 |
| Total bulk charge = +2 | Total bulk charge = +2 |

A bulk charge measurement according to established procedures would be incapable of distinguishing between these two cases. As far as we are aware, there is no commercially available equipment for quantifying the charge distribution in powder coating compositions, so an indirect measurement of the charge behaviour must be made and that is achieved in accordance with the invention by the use of the parameter τ as explained hereinafter. The degree of charge separation in case A is substantially less than that in case B, and it has been found that the application of τ permits the selection of case B rather than case A as the mixture capable of showing the higher separation.

Quantification is most readily achieved in respect of two coloured powder coating compositions between which a significant $\Delta E$ exists. A value of $\Delta E$ (pure) between the pure powder coating compositions is first determined. The two powder coating compositions are then mixed in equal weight proportions, caused to become tribostatically charged and the charged mixture sprayed through a powder delivery gun at two oppositely charged plates, resulting in a degree of separation of the two powder coating compositions on to the two charged plates according to the relative charges acquired by the two powder coating compositions. The tribostatic charging, preferably, includes fluidising the mixture and allowing it to develop its equilibrium natural tribostatic charge. After suitable treatment, for example stoving, causing the powder coating compositions to become fixed to the two plates, a value $\Delta E$ (mixture) is determined between the powder coating compositions on the two plates.

In accordance with the invention a parameter τ has been developed as a practical tool in the assessment of the triboelectric performance of two differently coloured powders using the parameter ΔE. The parameter τ is defined as τ=ΔE(mixture)/ΔE(pure). ΔE(pure) indicates a value for ΔE between two pure powders. The determination of ΔE (mixture) comprises mixing the two powders in about equal weight proportions, causing the charging of the resulting mixture by tribostatic interaction to establish equilibrium tribostatically charged conditions, preferably by fluidising, and causing the mixture to separate by spraying it through a powder delivery gun with no applied voltage at two oppositely charged plates, ΔE(mixture) being the value of ΔE between the "separated" mixture distributed on the oppositely charged plates.

It has been found that the use of colour information permits practical quantification of the extent to which tribostatically charged powder particles separate and that the results of colour measurements are of practical value in the selection of highly-separating powder mixtures.

Preferably, a powder coating composition is characterised by a triboelectric interaction factor τ, between the composition incorporating the wax and the same composition without the wax, of ≧0.25, ≧0.3, ≧0.4, ≧0.5, ≧0.6, ≧0.7 or ≧0.8, the value of τ being given by the relationship $$\tau = \Delta E(\text{composition mixture})/\Delta E(\text{pure compositions})$$

where $$\Delta E = (\Delta L^{*2} + \Delta a^{*2} + \Delta b^{*2})^{1/2}$$

with L*, a* and b* being respectively the z, y and x-coordinate variables under the CIE L*a*b*$_{1976}$ colour definition system, ΔE (pure compositions) being determined by colour spectrophotometric measurement and ΔE (composition mixture) being determined by mixing the two compositions in equal weight proportions, causing the charging of the resulting mixture by tribostatic interaction to establish equilibrium tribostatically charged conditions, directing the charged mixture onto two oppositely charged plates, resulting in a separation of the compositions on the two plates, and then determining ΔE, by colour spectrophotometric measurement, between the compositions as applied to the two plates, one or both of the respective initial pure compositions being dyed where appropriate to provide an enhanced ΔE between them to facilitate the determination of ΔE (pure compositions) and ΔE (composition mixture).

The ratio τ=ΔE (mixture)/ΔE (pure) is attributed to the mixture of the two powders. If, say, there has been total separation of the powder coating mixture between the two plates, then ΔE (mixture) would be the same as ΔE (pure) and the ratio τ would have a value of 1, possibly giving the same result as a subjective visual examination of the two plates. If, on the other hand, there has been no separation of the powder coating compositions between the two plates, the two plates would be of substantially the same colour and ΔE (mixture) would be substantially zero, leading to a ratio τ=0, which might be determined by visual inspection of the two plates. The ratio τ can, of course, be found to attain any value between 0 and 1, both limits included, according to the value of ΔE (mixture) between the powder coating compositions adhering to the plates in relation to ΔE between the pure powder coating compositions.

A modified form of the above procedure is applied in the case of two coloured powder coating compositions between which there is not a significant ΔE and, also, in the case of two white powders. The modification involves the addition of a first dyestuff to one powder and, where appropriate to provide an enhanced ΔE, the addition of a second dyestuff to the other powder coating composition, the added dyestuffs being such as not to influence the relative charges acquired by the powder coating compositions. The dyestuffs are so selected as to have a significant ΔE and the remainder of the procedure set out above is followed in order to obtain ΔE for the mixture of the two powder coating compositions. Following the addition of the dyestuffs, each dyed powder coating composition should be checked in relation to the triboelectric series in order to be sure that the addition of the dyestuff does not result in a change in the position of the powder coating composition in the triboelectric series.

Dyestuffs may also be used for determining the triboelectric performance of two white powder coating compositions following a check, as before, that the addition of the dyestuff does not cause a change in the position of either powder coating composition in the triboelectric series.

The value ΔE when used in the calculation of τ is considered to give accurate enough results for practical purposes although the use of ΔL*, Δa* and Δb* would be expected to provide more accurate determinations of τ.

It has been found that a value for ΔE of 2 is large enough to give satisfactory reproducible results in the determination of τ.

Values of τ greater than 0.25 have been noted to result in enhanced penetration of a mixture of powder coating compositions compared with the penetration of the respective powders into recesses, a value of τ greater than 0.5 is preferred and a value of T greater than 0.6 is especially preferred. More generally, the value of τ may be ≧0.3, ≧0.4≧0.5, ≧0.6, ≧0.7 or ≧0.8.

In the case of white powder coating compositions or coloured powder coating compositions showing not much difference in ΔE, the triboelectric performance may be quantified, alternatively or additionally, by incorporating a small amount of two heavy metal compounds into the respective powder coating compositions and measuring the relative amounts of the heavy metal compounds in the powder coating compositions after mixture and separation on to oppositely charged plates. The measurement would be by means of X-ray fluorescence spectroscopy or X-ray mass analysis using a scanning electron microscope.

For a mixture of a white basic powder coating composition and the white powder coating composition treated with a wax, a dyestuff is added to the wax-coated part, say, before the two parts are mixed, as a means of making it possible to determine T for the mixed basic-part and wax-treated part powder coated composition. A red dyestuff is chosen, added to a body of the basic powder coating composition and the basic-without-dyestuff and basic-with-dyestuff powder coating compositions compared in accordance with the CIE $L^*a^*b^*_{1976}$ system to determine ΔE(pure). Since red has coordinates of L*=50, a*=100, b*=0 in the CIE $L^*a^*b^*,_{1976}$ system, ΔE (pure)=Δa*(pure) provided Δb and ΔL are zero. An amount of the basic-with-dyestuff powder coating composition is then treated with a specific amount of a selected wax, the basic-with-dyestuff-with-wax and the basic powder coating compositions are mixed together, caused to become tribostatically charged, separated on to positive and negative plates and Δa*(mixture) is measured to give τ(mixture)=Δa*(mixture)/Δa*(pure).

The red dyestuff may be substituted by a green dyestuff, in which case, for the above procedure, τ=Δa* (mixture)/Δa* (pure), since green has coordinates L*=50, a*=−100, b*=0 and again ΔE=Δa* provided Δb and ΔL are zero.

Dyestuffs may also be used with coloured powder coating compositions in order to determine τ for basic-part and wax-treated part mixtures of those powder coating compositions.

The proportion of the dyestuff needed, that is, the proportion needed to achieve $\Delta E \geq 2$, will in general be $\leq 0.4\%$ by weight, although usually a lower proportion will suffice, say, of the order of 0.1%.

Having established a triboelectric series as described above, a corresponding determination is then made of the position in the series of the powder coating composition actually to be used for a given application (which may be a white or a coloured powder), hereinafter the "end user powder."

Advantageously, in the practice of the present invention, a wax is selected on the basis of the information provided by the triboelectric series to provide basic end user and wax-treated end user powder coating compositions which are separated in the triboelectric series (in either the positive or negative direction) and, preferably, the basic end user and the wax-treated end user powder coating compositions are widely separated in the triboelectric series.

Preferably, the separation between the basic end user and wax-treated end user powder coating compositions as assessed by the above method using the CIE $L^*a^*b^*_{1976}$ system gives a τ of more than 0.5 and, preferably, more than 0.6.

The position of any given powder coating composition in the triboelectric series may in principle be influenced by a number of variables, including:

(a) the nature and amount of any colouring agent (pigment or dye);

(b) the nature and amount of any filler/extender;

(c) the nature and amount of any post-blended additive;

(d) the use of a tribo-enhancing additive known from conventional tribostatic application to enhance the tribostatic performance such as, for example, an amino alcohol or a tertiary amine or other suitable pre-extrusion additive.

The effect of altering any of the above variables can be determined by routine experimentation.

BRIEF DESCRIPTION OF THE DRAWINGS

The invention will now be described with reference to the following drawings, in which:

FIG. 1 shows schematically measurement positions on a microwave cavity;

FIG. 2 illustrates the effect of dyestuff on the triboelectric position of a white hybrid;

FIG. 3 shows the difference in tribocharging between two colored samples;

FIG. 4 shows a perspective view of a corner test piece as used in Example 4.

EXAMPLES

Figure 5:
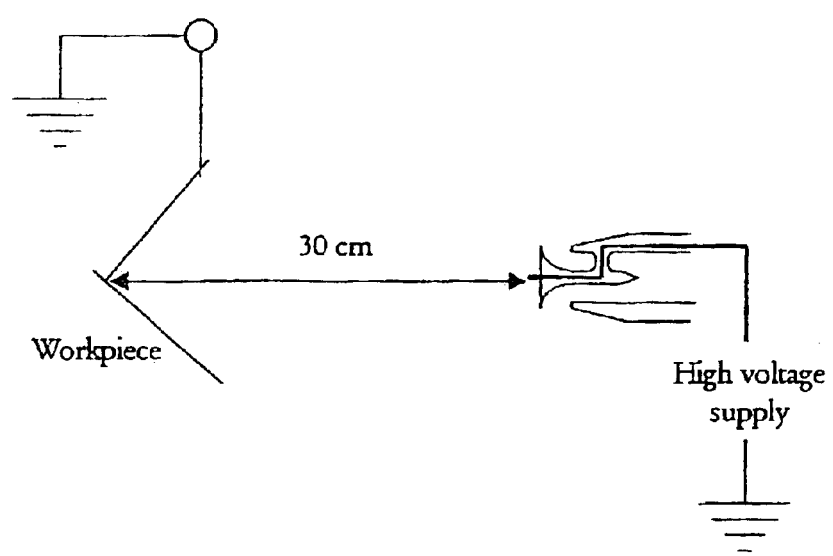
FIG. 5 shows diagrammatically a testing arrangement.

The following Examples illustrate the principles and practice of the present invention. The formulations used to make the compositions used in the Examples are set out in the Appendix thereto.

Example 1

Polyester/Epoxy White Hybrid Coating on a Microwave Oven Cavity (MWOC) Production Line Two powders were manufactured, Powder S1A and Powder S1B. The ingredients for extrusion (the same standard system in each case, disclosed as Composition S1 in the Appendix) were weighed, dry mixed in a blender and extruded in a twin-screw powder coating extruder.

The extrudate to form Powder S1A was kibbled to form chips, which were then micronised in an impact mill (Hosakawa ACM40) with the addition of:

| | |
|---|---|
| Aluminium oxide | 0.06% |

Extrudate to form Powder S1B was kibbled to form chips. These were blended in a 30-minute tumbling operation with:

| | |
|---|---|
| Aluminium hydroxide:aluminium oxide mixture (55:45 by weight)* | 0.5% |
| PTFE-modified polyethylene wax TF1725 (Lubrizol) | 0.07% |

*This mixture was pre-manufactured in a shear mixing operation whereby the two components are charged separately to the mixing vessel and mixed using 3 × 1-minute mixes at 1-minute intervals.

The resulting mixture was then micronised in an impact mill (Hosakawa ACM40) to form Powder S1B.

The particle size distribution of each powder following the micronising operation was:

| | |
|---|---|
| $d_{(v)99}$ | 130 microns |
| $d_{(v)50}$ | 45 microns |
| % < 10 microns | 7% |
| % < 5 microns | 2.5% |

The finished powders S1A and S1B were then tested on a coating line to coat microwave oven cavities. The line uses 6 robotic spray guns for the cavity interiors, and 6 reciprocating guns for the front part (all of type Gema PGC2). The microwave cavities were hung in columns of 3 (referred to herein as Top, Middle and Bottom cavity).

Firstly, the standard powder formulation milled with aluminium oxide (Powder S1A) was loaded to the system, and the guns set so that, on coating the cavities, no bare metal was visible on any internal area. This dictated a setting on the atomising air control of 2-bar pressure. Measurement of applied film thickness were made in seven defined locations on each cavity as shown in the side view (FIG. 1).

Powder S1A was then cleared from the system completely.

The powder milled with wax (Powder S1B according to the invention) was then loaded to the system, and the guns again set to achieve coverage such that no bare metal was revealed. This required a lower setting on the atomising air control, 1.4 bar pressure, as compared with Powder S1A. Measurements of film thickness over the cavity were made in the same seven defined locations on each cavity.

The results were collated in terms of average film thickness across the seven measurements, and the standard deviation for those measurements. These results are shown in Table 1 below.

TABLE 1

Average Film Thickness/Standard Deviation (microns) per Microwave Cavity (MWOC).

| POWDER | JIG POSITION | | | | | | |
|---|---|---|---|---|---|---|---|
| AVE/ | Top(μm) | | Middle(μm) | | Bottom(μm) | | Powder |
| MWOC | Ave | Std Dev | Ave | Std Dev | Ave | Std Dev | Air |
| S1A | 125.0 | 28.6 | 101.6 | 27.4 | 97.1 | 32.3 | 2.0 bar |
| S1B | 67.7 | 15.2 | 79.2 | 26.4 | 63.4 | 20.7 | 1.4 bar |

It was found that the total powder requirement to achieve acceptable coverage using Powder S1B according to the invention was 35% less than for the comparison Powder S1A.

Example 2

Effect of Different Waxes on a Triboelectric Series

Analogously to the process described in Example 1, a series of powders was made from formulations T1 to T9 as set out in the Appendix, and a quantity of Powder S1A was also taken. In order to establish a triboelectric reference series, the resulting ten powders were tested in pairs so that each powder was tested against every other powder.

For each test, 10 g of each of the two powders was weighed and placed into a glass jar. A lid was placed on the jar, and it was shaken thoroughly for two minutes to mix the powders. Following a 30-second relaxation time, the lid was removed and the resulting mixture sprayed at two charged panels. The panels were suspended from an earthed clamp stand by insulated dips. A voltage was applied to each panel by means of a Brandenburg high-voltage generator, +20 kV to one, −20 kV to the other, with the current set to the minimum value that would sustain that voltage. The glass jar was held with its open end directed toward the panels, and compressed air was sprayed gently into the jar, such that the powder was ejected from the jar and towards the panels in a controlled stream.

For each applied powder blend the positive and negative panels were examined to determine (a) if any separation of the components of the blend had occurred on application, and (b) in cases where segregation had occurred, which powder had deposited predominantly on the positive panel, and which powder had deposited predominantly on the negative panel. From these observed pairs, it was possible to conclude that in every case there was a difference in the composition on each panel, and that the powder depositing more on the positive panel was lower in the triboelectric series (more negative), whilst the powder depositing more on the negative panel was higher in the triboelectric series (more positive). By a series of such observations, it was possible to construct the triboelectric reference series shown in Table 2 below.

TABLE 2

Position of Unmodified Powders in a Relative Triboelectric Series

| Powder Code | Detail |
|---|---|
| T1 | Black hybrid |
| T2 | Red hybrid |
| T3 | Green polyester/Primid |
| T4 | Blue hybrid |
| T5 | Black hybrid |
| T6 | Green hybrid |
| T7 | White hybrid 2 |
| S1A | White hybrid |
| T8 | Brown hybrid |
| T9 | Yellow hybrid |

It can be seen that Powder S1A, which is Composition S1 with Aluminium Oxide as the only post-blended additive, lies near to the bottom of this series.

Composition S1 was then modified according to the invention, by incorporation of post-blended wax additives to produce six further powders as per Table 3 below. In each case, the specified wax additive was used in conjunction with a 55%:45% by weight blend of aluminium hydroxide and aluminium oxide.

TABLE 3

Post-Extrusion Additives Micronised into Composition S1

| Powder Code | Inorganic additive | Wax |
|---|---|---|
| S1B | 0.5% of a 55:45 blend of Aluminium Hydroxide: Aluminium Oxide | 0.07% PTFE-modified PE wax TF1725 (Lubrizol)) |
| S1C | | 0.07% PTFE-modified PE wax TF1780 (Lubrizol) |
| S1D | | 0.07% pure Polyethylene wax PE1500F (Lubrizol) |
| S1E | | 0.07% pure PTFE wax TF1790 (Lubrizol) |
| S1F | | 0.07% polyamide wax A1601 (Lubrizol) |
| S1G | | 0.07% polyamide wax HM1666 (Lubrizol) |

Analogously to the procedure described above, a new triboelectric series was constructed using these modified powders. It is seen that the position of Composition S1 in the series varied markedly according to the nature of the wax additive incorporated during milling, as shown in Table 4 below.

TABLE 4

Triboelectric Series Incorporating Modified Composition S1 (Powders S1B-S1G)

| Powder Code | Detail |
|---|---|
| (S1B)/(S1C) | (S1/TF1725) (S1/TF1780) |
| T1 | Black hybrid |
| T2 | Red hybrid |
| T3 | Green polyester/Primid |
| T4 | Blue hybrid |
| T5 | Black hybrid |
| S1D/S1E | (S1/TF1790) (S1/PE1500F) |
| T6 | Green hybrid |
| (T7)/(S1F)/(S1A)/(S1G) | (White hybrid 2) (S1/A1601) (S1/Al$_2$O$_3$) (S1/HM1666) |
| T8 | Brown hybrid |
| T9 | Yellow hybrid |

It was not possible by this technique to differentiate between white powders if they were adjacent to each other in the series, hence in the Table these appear grouped together. The incorporation of waxes has moved the position of the S1 white hybrid powders in the triboelectric series vis-a-vis the coloured powders, but a different technique is required, as illustrated in Example 3 below, to distinguish between the individual white powders.

Example 3

Distinguishing Between White Powders

In the series of powders from Example 2, there were two unmodified white hybrid formulations, T7 and S1A. White hybrid 2 (T7) was re-made in an identical fashion, except that 0.3% of a commercial red dyestuff (Savinyl Red, ex. Clariant) was incorporated pre-extrusion. This new powder was labelled T10.

In the triboelectric series established as described in Example 2, T7 was placed between T6 (green hybrid) and T8 (brown hybrid).

Following the same procedure as Example 2, tribostatic testing was carried out between T6/T10, and T8/T10.

The inclusion of the low level of the red dye was found to have had no effect on triboelectric position. T100 was situated below T6 and above T8, in exactly the same position as the original formulation T7, as illustrated in FIG. 2.

A green version of Composition S1 (white hybrid 1) was then made by incorporating 0.4% of a commercially available dyestuff (Savinyl Green, ex. Clariant) into the pre-extrusion blend. This was labelled Composition S2 and the formulation is disclosed in the Appendix.

The colour of T10 was compared spectrophotometrically to its white counterpart, T7. This involved establishment of the CIE $L^*a^*b^*_{1976}$ CO-ordinates following measurement on a Datacolor colour management system.

The parameters used for all measurements in this Example were: Illuminant D65; Observer 10°, Geometry d/8°. These terms will be understood by all involved in the measurement of colour, for example in the textile and coatings industries.

A procedure developed in accordance with the invention for the determination of τ is as set out below. The procedure is applicable generally in the practice of the invention and is not restricted to the specific mixtures described herein.

Prepare a basic formulation as a chip form (sample A)

Prepare a basic formulation including a small amount of dyestuff, but otherwise identical to the sample A formulation (sample B)

Micronise the samples A and B independently to produce powder coating samples A' and B'.

Prepare a 50:50 mixture of A' and B' and fluidise/spray at charged plates to ensure that there is no separation due to the inclusion of the dyestuff (i.e. equal colours on both the positive and negative plates, or in τ terms, $\tau_{A'\text{-}B'}=0$).

Mix a PTFE-modified wax into chip A at 0.2% and micronise to make a powder C' (the 0.2% because this powder will subsequently be mixed 50:50 with another powder, giving 0.1% wax in the finished powder).

Mix powder C' (wax treated, non-dyed) with B' (non wax treated, dyed) in 50:50 weight ratio.

Carry out a fluidisation/spraying test using the mixture C'-B' and determine if there is any preferential deposition on the charged plates. Any colour difference relating to the pure colours of B' (dyed) and C' (non-dyed) will enable calculation of τ, in accordance with the relationship given, hereinbefore.

The fluidise/spray step of the above procedure is as follows:

Each mixture is charged into a fluidised bed (ITW Gema Volstatic, fluidising air pressure 1 bar) and allowed to fluidise for 30 minutes. The powder is then spray applied using an ITW Gema Volstatic corona application gun with the gun voltage at zero (gun settings: fluidising air pressure 1.0 bar, conveying air 0.6 bar, supplementary air 3.5 m³ hour$^{-1}$, single point corona needle at zero volts, baffle nozzle). The sprayed powder cloud is directed towards two panels, one held at −20 kV and another one held at +20 kV. The panel voltage was supplied by means of two Brandenburg Alpha III high voltage power supply units with the current set to the minimum value that would sustain the voltage. Following application of the powder cloud to the panels for 10 seconds, spraying was stopped, the voltage was removed from the panels, and the coated panels were stoved (10 minutes at 180° C.) in order to fix the applied powder to the panels for subsequent inspection and analysis.

The triboelectric interaction factor τ defined hereinbefore was then determined for the mixtures, as described above, by measuring the colour difference between the powders deposited from each mixture onto two oppositely charged panels. Since the changes under consideration were in redness or greenness only, Δa=ΔE and accordingly only Δa was used.

Since the powders were to be tested in pairs to determine the degree of separation between positive and negative panels, the difference between the pure colours was first measured to establish a maximum as a base line. These values are shown in Table 5, and represent a τ of 1.0.

TABLE 5

Colour Difference between Pure Red or Green and White.

| Powder 1 | Powder 2 | Colour Difference Δa |
|---|---|---|
| S1A (white hybrid, Al$_2$O$_3$) | S2 (green S1) | 25.1 |
| T7 (white hybrid 2, SiO$_2$) | T10 (red T7) | 27.7 |

This concept is represented pictorially in FIG. 3.

By reference to these colour differences, it was then possible for all future tests to show a τ value for the powder mixture by measuring the Δa and expressing it as a ratio of the maximum Δa from Table 5. If two powders were completely separated in the triboelectric series, there would be pure colour on each panel, so Δa (max)=Δa (measured). As τ=Δa (measured)/Δa (max), this means τ=1.0. If there were no splitting, the powders would apply equally to both positive and negative panels. The Δa would be 0, and Δa(max)/Δa (measured)=0, therefore τ=0.

Several powder pairs were tested, and the results in terms of τ from comparing the positive and negative panels are shown in Table 6.

TABLE 6

τ values for White Powder Mixtures

| Powder 1 | Powder 2 | Δa | τ |
|---|---|---|---|
| S1 + amide wax Ceridust 3910 post-blended | T10 | 21.9 | 0.79 |
| S1A | S2 + TF1780 PTFE wax | 15.9 | 0.63 |
| T7 | S2 + A1601 amide wax | 16.5 | 0.66 |
| T10 | S1B (S1 + TF1725 PTFE wax) | 17.9 | 0.65 |

All results use the negative panel as the standard

On the basis of visual observation of the coatings deposited from powder mixtures onto positive and negative panels as hereinbefore explained, it was possible to establish a triboelectric series for the various white hybrids as shown in Table 7.

TABLE 7

Triboelectric Series of White Hybrids

| S1B | S1 + TF1725 PTFE wax |
| S1C | S1 + TF1780 PTFE wax |
| S1D | S1 + PE1500F PE wax + |
| S1F | S1 + A1601 amide wax |
| T7 | White hybrid 2 (no wax) |
| S1A | S1 no wax |
| S1G | S1 + HM1666 amide wax |

It was thus proven that not only can coloured powders be ranked in the triboelectric series, but also white powders. Furthermore, the strength of the effect of any particular wax on the triboelectric properties of a white powder can be expressed in terms of a τ value for the same base powder with and without the wax addition.

Example 4

Effect of Wax in Conjunction with Post-Blended Inorganic Additive

Powder coating compositions V1–V3 (shown in the Appendix) were manufactured by weighing out, dry-mixing, and extruding in a twin-screw extruder with a barrel temperature of 110° C. The resulting extrudate was cooled and kibbled to produce small chips, and blended with the various post-blended additives as shown in the Appendix and summarised below:

| Composition | Post-blended additive |
|---|---|
| V1 | Fumed silica |
| V2 | Aluminium hydroxide/aluminium oxide blend |
| V3 | Wax + aluminium hydroxide/aluminium oxide blend |

The chip/additive blends were micronised using an Alpine 100 UPZ impact mill and passed through a 150-micron mesh sieve to yield the following particle size distribution:

| | |
|---|---|
| $d_{(v)99}$ | 130 microns |
| $d_{(v)50}$ | 55 microns |
| % < 10 microns | 7% |
| % < 5 microns | 2.5% |

Each powder was tested using a standard set of conditions, spray coating test pieces as shown in FIG. 4 using an ITW Gema Volstatic corona application gun, using the procedure outlined below to ensure consistent application for each powder coating.

FIG. 4 shows a perspective view of a corner test piece as used in Example 4. Each test piece is formed from three planar sections at right angles to each other.

In each test, a corner piece as shown in FIG. 4 was suspended in an application booth from the hole shown in the top of the piece. The corner piece was allowed to come to rest at its natural centre of gravity, as shown in FIG. 5, which shows the test arrangement in diagrammatic form.

The powder coating application gun was clamped into position such that the gun was pointing directly at the corner of the test piece, with a gun-tip to corner distance of 30 cm. The panel was coated (gun settings: fluidising air 1.0 bar, conveying air 0.6 bar, supplementary air 3.5 m³ hour⁻¹, single corona needle conical baffle nozzle at 50 kV). The weight of the coated panel was recorded, and compared with the uncoated weight of the panel. A range of application trials were carried out for each powder coating composition until an applied weight of 4.0 grams of powder coating had been achieved. The resulting coated test piece was then stoved to give a cured film (stoving conditions: 10 minutes at 180° C.), and reserved for further inspection.

For each coated test piece, the degree of penetration of the composition into the corner region was visually assessed.

In order to remove the subjective nature of an individual visual assessment of the penetration, six people individually assessed the coated test pieces and ranked the penetration from best to worst leading to overall assessments as follows:

| Best<---------------->Worst | | |
|---|---|---|
| V3 | V2 | V1 |

There were very significant differences in the performance of the three compositions. Thus the worst sample, composition V1, was uncoated to an average distance of 1 cm. either side of the corner. The best, V3 (incorporating both a wax and an aluminium hydroxide/aluminium oxide blend as post-blended additives) was fully coated over the entire surface.

Example 5

Effect of Particle Size Distribution

Composition S1 was manufactured by dry blending the ingredients in a shear mixer, extruding in a twin-screw extruder at 110° C., and cooling and kibbling the resultant extrudate to form chips.

The resultant chip was split into three parts for micronising. To each was added

| | |
|---|---|
| Aluminium hydroxide:aluminium oxide mixture (55:45)* | 0.5% |
| PTFE-modified polyethylene wax TF1725 (Lubrizol) | 0.07% |

Each chip was micronised in an Alpine 100 UPZ impact mill, using different settings to produce three powders of different particle size distribution—Powders S1H, S1I and S1J. The particle size distributions were as detailed in Table 8 below.

TABLE 8

| Powder | $d_{(v)99}$ microns | $D_{(v)50}$ microns | % < 10u | % < 5u |
|---|---|---|---|---|
| S1H | 105.6 | 33.1 | 10.2 | 3.6 |
| S1I | 68.9 | 26.6 | 12.7 | 4.3 |
| S1J | 57.8 | 20.8 | 16.7 | 6.1 |

The powders were all tested in the same way. The powder was placed in a fluidised bed at an air pressure of 1.0 bar, and sprayed into a microwave cavity from a gun (Gema PGC2) perpendicular to the gun opening, at a distance of 10 cm. from the front face.

The gun settings were:

| | |
|---|---|
| Conveying air: | 1 bar |
| Supplementary air | 3 m³/hr |
| Rinsing air: | 2 m³/hr |

These settings gave a powder output of 150–170 g/min.

The results were calculated in two ways. Film thicknesses were measured at the locations shown in Example 1, and a standard deviation of the measurements was calculated for each powder. Also, a ratio of powder thickness in the microwave turntable to the thickness in the back corner was calculated. The ideal would be a 50:50 ratio. The results for the three powders are given in Table 9.

TABLE 9

Powder Uniformity vs. Particle Size

| Powder | Standard Deviation (um) | Turntable:Corner ratio |
|---|---|---|
| S1H | 31.2 | 66.0:34.0 |
| S1I | 32.1 | 67.6:32.4 |
| S1J | 35.1 | 68.2:31.8 |

There is a small but significant particle size effect, with the coarsest powder (S1H) showing the best performance.

Example 6

Putting Two Opposite Waxes in Same Powder

Samples were taken of Powders S1B and S1G from Example 2 (Composition S1 with the following post-blended additives)

| Powder S1B | |
|---|---|
| Aluminium hydroxide:aluminium oxide mixture (55:45)* | 0.5% |
| PTFE-modified polyethylene wax TF1725 (Lubrizol) | 0.07% |

| Powder S1G | |
|---|---|
| Aluminium hydroxide:aluminium oxide mixture (55:45)* | 0.5% |
| Polyamide wax HM1666 (Lubrizol) | 0.07% |

*prepared as described in Example 1.

As a result of the different waxes used, powders S1B and S1G were at opposite ends of the triboelectric series established in Example 2. The two powders, each incorporating a different wax, were mixed together in a 50:50 ratio to produce Powder S1K.

A powder S1L was then prepared, having the same composition as S1K, by incorporating both waxes (and the aluminium hydroxide/aluminium oxide blend) with kibbled chip of composition S1 and then milling the resulting blend to the same particle size distribution as Powder S1K.

In a standard test procedure for coating microwave over cavities as outlined in Example 5, it was found that Powder S1K gave a significantly more uniform coating than Powder S1L, as demonstrated by a lower standard deviation between the various measurement locations and a turntable:corner ratio reduced from 3:1 to 2:1.

These results indicate that, if two different waxes are used, the performance of the powder will be better if the waxes are each milled separately with a quantity of the composition, followed by blending of the resulting powders, than if both waxes are incorporated together prior to milling.

In general, for the wax-containing compositions of the invention disclosed in the foregoing Examples, the triboelectric interaction factor $\tau$ will be at least 0.5.

APPENDIX

Composition S1 (White hybrid) (Used in Powders S1 A–L)

| Material | Amount |
|---|---|
| Black Iron Oxide Pigment | 1 g |
| Wax coated silica | 5 g |
| Barium Sulphate | 55 g |
| 10% catalyst in acid functional polyester resin | 19 g |
| Benzoin | 3 g |
| Amine modified wax | 5 g |
| Rutile Titanium Dioxide | 348 g |
| 10% acrylic flow aid in epoxy resin | 79 g |
| Epoxy functional resin, equivalent weight 770 | 152 g |
| Carboxy functional polyester, acid value 52 | 330 g |
| Polyvinyl butyral resin | 2 g |

Composition S2 (White hybrid with green dye)

| Material | Amount |
|---|---|
| Black Iron Oxide Pigment | 1 g |
| Wax coated silica | 5 g |
| Barium Sulphate | 55 g |
| 10% catalyst in acid functional polyester resin | 19 g |
| Benzoin | 3 g |
| Amine modified wax | 5 g |
| Rutile Titanium Dioxide | 348 g |
| 10% acrylic flow aid in epoxy resin | 79 g |
| Epoxy functional resin, equivalent weight 770 | 152 g |
| Carboxy functional polyester, acid value 52 | 330 g |
| Polyvinyl butyral resin | 2 g |
| Savinyl Green 2GLS dyestuff (Clariant) | 4 g |

Composition T1 (Black Hybrid)

| Material | Amount |
|---|---|
| Carboxy functional polyester, acid value 34 | 322 g |
| Carbon Black | 15 g |
| Additol catalyst | 2 g |
| Polyethylene wax | 4 g |
| Benzoin | 2 g |
| Acid amidine curing agent | 9 g |
| Barytes extender | 376 g |
| Flow agent | 107 g |
| Epoxy resin, epoxy equivalent weight 700 | 161 g |
| Post-blended | |
| Acematt TS100 | 1 g |

Composition T2 (Red Hybrid)

| Material | Amount |
|---|---|
| Carboxy functional polyester, acid value 40 | 259 g |
| Acid amidine curing agent | 12 g |
| Additol catalyst | 1 g |
| Polyethylene wax | 4 g |
| Antioxidant | 2 g |
| Iron oxide red pigment | 3 g |
| Rutile titanium dioxide | 22 g |
| Isoidaline yellow pigment | 12 g |
| Napthal mono-azo red pigment | 37 g |

Composition T2 (Red Hybrid)

| Material | Amount |
|---|---|
| Barytes extender | 370 g |
| Flow agent | 7 g |
| Epoxy resin, epoxy equivalent weight 700 | 270 g |
| Post-blended | |
| Acematt TS100 | 1 g |

Composition T3 (Green Polyester Primid)

| Material | Amount (g) |
|---|---|
| Component A | |
| Carboxy functional polyester, acid value 40 | 312 |
| Zinc Ferrite Brown Pigment | 8 |
| Carbon Black | 1 |
| Pthalocyanine green pigment | 9 |
| Rutile titanium dioxide | 2 |
| Flow Agent | 7 |
| Benzoin | 3 |
| Polyethylene Wax | 1 |
| Anti-Oxidant | 1 |
| Primid Crosslinker | 23 |
| Aluminum Hydroxide | 25 |
| Barytes Extender | 75 |
| Component B | |
| Carboxy Functional polyester, acid value 80 | 37 |
| Carboxy Functional polyester, acid value 25 | 350 |
| Zinc ferrite Brown Pigment | 8 |
| Carbon Black | 1 |
| Pthalocyanine green pigment | 9 |
| Rutile titanium dioxide | 2 |
| Flow Agent | 7 |
| Benzoin | 3 |
| Polyethylene Wax | 1 |
| Anti-Oxidant | 1 |
| Primid Crosslinker | 13 |
| Aluminum Hydroxide | 25 |
| Barytes Extender | 87 |
| Extruded Components A and B mixed 50:50, and post-blended additives incorporated | |
| Dry Flow additive | 7 |
| PE/PTFE Wax | 1 |

Composition T4 (Blue Hybrid)

| Material | Amount |
|---|---|
| Carboxy functional polyester, acid value 35 | 441 g |
| Benzoin | 3 g |
| Polyethylene wax | 3 g |
| Hydrogenated castor oil | 10 g |
| Additol catalyst | 2 g |
| Rutile titanium dioxide | 38 g |
| Pthalocyanine blue pigment | 37 g |
| Flow agent | 7 g |
| Epoxy resin, epoxy equivalent weight 700 | 178 g |
| Barytes extender | 280 g |
| Post-blended | |
| Acematt TS100 | 1 g |

Composition T5 (Black Hybrid)

| Material | Amount (g) |
|---|---|
| Carboxy functional Polyester resin. Acid value 34 | 262 |
| Iron Oxide Red Pigment | 1 |
| Carbon Black | 15 |
| Chrome Antimony Oxide Yellow Pigment | 4 |
| Rutile Titanium Dioxide | 2 |
| Magnesium Silicate Talc | 7 |
| Glycidyl Functional curing agent | 12 |
| Additol Catalyst | 20 |
| PTFE Wax | 2 |
| Antioxidant | 1 |
| Barytes Extender | 275 |
| Epoxy Resin equivalent weight 760 | 62 |
| Post-blended | |
| Blend aluminium hydroxide:aluminium oxide 55:45 | 3 |
| PE/PTFE Wax | 1 |

Composition T6 (Green Hybrid)

| Material | Amount |
|---|---|
| Carboxy functional polyester, acid value 40 | 245 g |
| Pthalocyanine green pigment | 20 g |
| Isoindolinone yellow pigment | 19 g |
| Rutile titanium dioxide | 21 g |
| Polyethylene wax | 2 g |
| Antioxidant | 1 g |
| Benzoin | 3 g |
| Additol catalyst | 2 g |
| Barytes extender | 325 g |
| Flow agent | 11 g |
| Epoxy resin, epoxy equivalent weight 700 | 169 g |
| Carboxy functional polyester, acid value 34 | 181 g |
| Post-blended | |
| Acematt TS100 | 1 g |

Compotion T7 (White Hybrid)

| Material | Amount |
|---|---|
| Carboxy functional polyester, acid value 34 | 242 g |
| Ultramarine blue pigment | 1 g |
| Additol catalyst | 2 g |
| Carnauba wax | 3 g |
| Benzoin | 3 g |
| Barytes extender | 107 g |
| Rutile titanium dioxide | 321 g |
| Flow agent | 9 g |
| Epoxy resin, epoxy equivalent weight 510 | 151 g |
| Carboxy functional polyester, acid value 40 | 160 g |
| Post-blended | |
| Acematt TS100 | 1 g |

Composition T8 (Brown Hybrid)

| Material | Amount |
|---|---|
| Carboxy functional polyester resin, acid value 75 | 248 g |
| Carbon black | 9 g |

Composition T8 (Brown Hybrid)

| Material | Amount |
| --- | --- |
| Iron oxide red pigment | 10 g |
| Chrome/antimony oxide yellow pigment | 23 g |
| Rutile titanium dioxide | 1 g |
| Polytheylene wax | 4 g |
| Benzoin | 3 g |
| Barytes extender | 372 g |
| Flow agent | 7 g |
| Epoxy resin, epoxy equivalent weight 850 Post-blended | 322 g |
| Acematt TS100 | 1 g |

Composition T9 (Yellow Hybrid)

| Material | Amount |
| --- | --- |
| Carboxy functional polyester, acid value 40 | 461 g |
| Diarylide yellow pigment | 2 g |
| Chrome/antimony oxide yellow pigment | 19 g |
| Quinopthalone yellow pigment | 34 g |
| Additol catalyst | 1 g |
| Aluminium silicate | 9 g |
| Benzoin | 3 g |
| Barytes extender | 84 g |
| Rutile titanium dioxide | 184 g |
| Flow agent | 10 g |
| Epoxy resin, epoxy equivalent weight 770 Post-blended | 192 g |
| Acematt TS100 | 1 g |

Compostion T10 (White Hybrid 2 with Red Dye)

| Material | Amount |
| --- | --- |
| Carboxy functional polyester, acid value 34 | 242 g |
| Ultramarine blue pigment | 1 g |
| Additol catalyst | 2 g |
| Carnauba wax | 3 g |
| Benzoin | 3 g |
| Barytes extender | 107 g |
| Rutile titanium dioxide | 321 g |
| Flow agent | 9 g |
| Epoxy resin, epoxy equivalent weight 510 | 151 g |
| Carboxy functional polyester, acid value 40 | 160 g |
| Savinyl Fire Red GLS dyestuff (Clariant) Post-blended | 3 g |
| Acematt TS100 | 1 g |

Compositionvs V1–V3 (Black Polyester/Epoxy/PT910 Texture Systems)

| Material | V1 | V2 | V3 |
| --- | --- | --- | --- |
| Carboxy functional polyester (AV = 33) | 39.0 g | 39.0 g | 39.0 g |
| Catalyst in resin | 3.0 g | 3.0 g | 3.0 g |
| PE/PTFE wax TF1702 (Lubrizol) | 0.3 g | 0.3 g | 0.3 g |
| Antioxidant | 0.15 g | 0.15 g | 0.15 g |
| Antistatic additive | 0.3 g | 0.3 g | 0.3 g |
| Epoxy resin | 9.28 g | 9.28 g | 9.28 g |
| Red iron oxide | 0.22 g | 0.22 g | 0.22 g |
| Carbon black | 2.19 g | 2.19 g | 2.19 g |
| Nickel titanate pigment | 0.64 g | 0.64 g | 0.64 g |
| Titanium dioxide | 0.29 g | 0.29 g | 0.29 g |
| Talc | 2.2 g | 2.2 g | 2.2 g |
| Barium Sulphate extender | 40.5 g | 40.5 g | 40.5 g |
| Epoxy hardener PT910 (Ciba) | 1.83 g | 1.83 g | 1.83 g |
| Post-blended materials | | | |
| PE/PTFE TF1725 (Lubrizol) | 0.00 g | 0.00 g | 0.07 g |
| Fumed silica | 0.1 g | 0.00 g | 0.00 g |
| $Al_2O_3Al(OH)_3$ (45:55 ratio, preblended) | 0.00 g | 0.50 g | 0.50 g |

What is claimed is:

1. A powder coating composition which incorporates a wax in post-blended form, there being a triboelectric interaction factor $\tau$, between the composition incorporating the wax and the same composition without the wax, of 0.25, the value of $\tau$ being given by the relationship $$\tau = \Delta E(\text{composition mixture})/\Delta E(\text{pure compositions})$$

where $$\Delta E = (\Delta L^{*2} + \Delta a^{*2} + \Delta b^{*2})1/2$$

with $L^*$, $a^*$ and $b^*$ being respectively the z-, x- and y-coordinate variables under the CIE $L^*a^*b^*_{1976}$ color definition system, $\Delta E$ (pure compositions) being determined by color spectrophotometric measurement and $\Delta E$ (composition mixture) being determined by mixing the two compositions in equal weight proportions, causing charging of the resulting mixture by tribostatic interaction to establish equilibrium tribostatically charged conditions, directing the charged mixture onto two oppositely charged plates, resulting in a separation of the compositions on the two plates, and then determining $\Delta E$, by color spectrophotometric measurement, between the compositions as applied to the two plates, one or both of the respective initial pure compositions being dyed where appropriate to provide an enhanced $\Delta E$ between them to facilitate the determination of $\Delta E$ (pure compositions) and $\Delta E$ (composition mixture).

2. A powder coating composition as claimed in claim 1, wherein said triboelectric interaction factor $\tau$ is $\geq 0.3$.

3. A powder coating composition as claimed in claim 1, wherein said triboelectric interaction factor $\tau$ is $\geq 0.4$.

4. A powder coating composition as claimed in claim 1, wherein said triboelectric interaction factor $\tau$ is $\geq 0.5$.

5. A powder coating composition as claimed in claim 1, wherein said triboelectric interaction factor $\tau$ is $\geq 0.6$.

6. A powder coating composition as claimed in claim 1, wherein said triboelectric interaction factor $\tau$ is $\geq 0.7$.

7. A powder coating composition as claimed in claim 1, wherein said triboelectric interaction factor $\tau$ is $\geq 0.8$.

8. A powder coating composition as claimed in any one of claims 1 to 7, wherein the wax is selected from the group consisting of polyethylene (FE) wax, polytetrafluoroethylene (PTFE) wax, FE wax modified with PTFE or polyamide, and polyamide wax.

9. A powder coating composition as claimed in any one of claims 1 to 7, wherein the amount of post-blended wax is in the range from 0.03 to 2% by weight, based on the weight of the composition without the wax.

10. A powder coating composition as claimed in claim 9, wherein the amount of post-blended wax is in the range of from 0.03 to 0.8% by weight, based on the weight of the composition without the wax.

11. A powder coating composition as claimed in claim 9, wherein the amount of post-blended wax is in the range of from 0.03 to 0.5% by weight, based on the weight of the composition without the wax.

12. A powder coating composition as claimed in claim 9, wherein the amount of post-blended wax is in the range of from 0.03 to 0.3% by weight, based on the weight of the composition without the wax.

13. A powder coating composition as claimed in claim 9, wherein the amount of post-blended wax is in the range of from 0.03 to 0.2% by weight, based on the weight of the composition without the wax.

14. A powder coating composition as claimed in claim 9, wherein the amount of post-blended wax is in the range of from 0.03 to 0.1% by weight, based on the weight of the composition without the wax.

15. A powder coating composition as claimed in claim 9, wherein the amount of post-blended wax is in the range of from 0.05 to 0.1% by weight, based on the weight of the composition without the wax.

16. A powder coating composition as claimed in claim 9, wherein the amount of post-blended wax is in the range of from 0.07 to 0.1% by weight, based on the weight of the composition without the wax.

17. A powder coating composition as claimed in claim 1 which incorporates, as further post-blended additives, a combination of aluminium oxide and aluminium hydroxide.

18. A process for forming a coating on a substrate, in which a composition as claimed in claim 1 is applied to the substrate by a powder coating process resulting in particles of the composition adhering to the substrate, and forming the adherent particles into a continuous coating.

19. A process as claimed in claim 18, wherein the powder coating process is a corona application process.

20. A process as claimed in claim 18 or claim 19, wherein the substrate is an article having recessed portions subject to the Faraday cage effect.

21. A process as claimed in claim 20, wherein the article has multiple faces and the ratio of the minimum to maximum coating thickness is at least 40%.

22. A process as claimed in claim 21, wherein the said ratio is at least 50%.

23. A coated substrate whenever obtained by a process as claimed in claim 18.

* * * * *

UNITED STATES PATENT AND TRADEMARK OFFICE
CERTIFICATE OF CORRECTION

PATENT NO. : 6,800,334 B2
DATED : October 5, 2004
INVENTOR(S) : Care et al.

It is certified that error appears in the above-identified patent and that said Letters Patent is hereby corrected as shown below:

<u>Column 26,</u>
Line 23, please change "wax and the same composition without the wax, of 0.25, the" to read -- wax and the same composition without the wax of $\geq$ 0.25, the --;
Line 24, please change "value of $\tau$being given by the relationship" to read -- value of $\tau$ being given by the relationship --;
Line 50, please change "wherein said triboelectric interaction factor $\tau$is $\geq 0.3$." to read -- wherein said triboelectric interaction factor $\tau$ is $\geq 0.3$. --;
Line 52, please change "wherein said triboelectric interaction factor $\tau$is $\geq 0.4$." to read -- wherein said triboelectric interaction factor $\tau$ is $\geq 0.4$. --;
Line 54, please change "wherein said triboelectric interaction factor $\tau$is $\geq 0.5$." to read -- wherein said triboelectric interaction factor $\tau$ is $\geq 0.5$. --;
Line 56, please change "wherein said triboelectric interaction factor $\tau$is $\geq 0.6$." to read -- wherein said triboelectric interaction factor $\tau$ is $\geq 0.6$. --;
Line 58, please change "wherein said triboelectric interaction factor $\tau$is $\geq 0.7$" to read -- wherein said triboelectric interaction factor $\tau$ is $\geq 0.7$. --;
Line 60, please change "wherein said triboelectric interaction factor $\tau$is $\geq 0.8$." to read -- wherein said triboelectric interaction factor $\tau$ is $\geq 0.8$. --;

Signed and Sealed this

First Day of March, 2005

JON W. DUDAS
*Director of the United States Patent and Trademark Office*